July 31, 1945.        A. T. HANES, JR        2,380,593
TOOL SETTING GAUGE
Filed Jan. 6, 1944
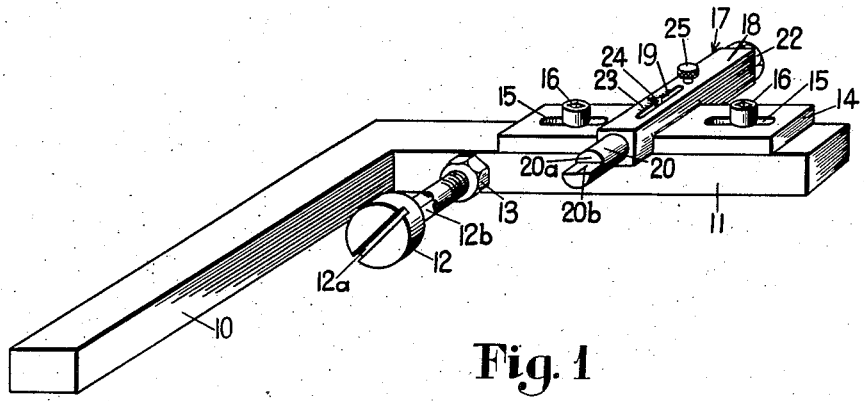
Fig. 1
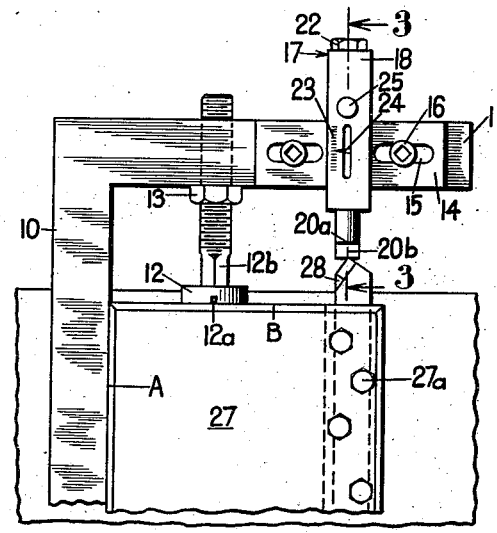
Fig. 2
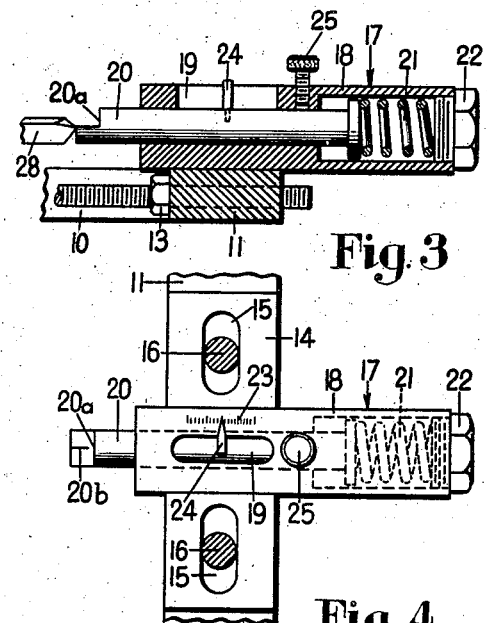
Fig. 3
Fig. 4
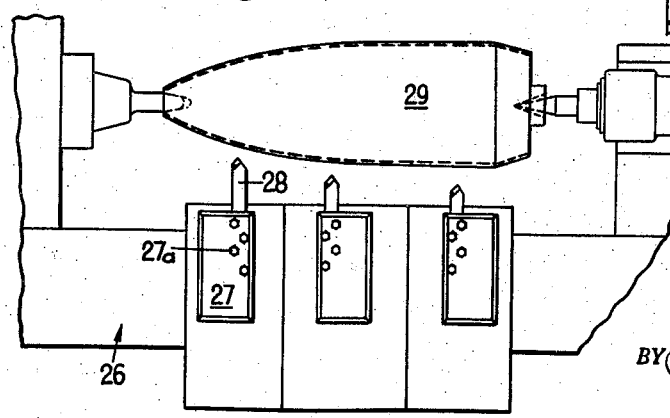
Fig. 5
INVENTOR.
Allen T. Hanes Jr.
BY Corbett, Mahoney & Miller
ATTORNEYS Patented July 31, 1945

2,380,593

UNITED STATES PATENT OFFICE 2,380,593

TOOL SETTING GAUGE

Alien T. Hanes, Jr., Columbus, Ohio

Application January 6, 1944, Serial No. 517,187

7 Claims. (Cl. 33—185)

My present invention relates to tool setting gauges. It has to do, more particularly, with an improved gauge for adjusting and properly setting the cutting tools or lathes and similar machines.

Heretofore, gauges for setting cutting tools have been of relatively complicated nature, costly to manufacture, and in use, required the services of a skilled workman or mechanic to set the tools to properly effect or perform the cutting operation desired.

One of the objects of my invention is to provide an improved gauge of the foregoing character which is of relatively simple construction and which is extremely easy to handle in determining or gauging the desired and proper setting of the cutting tool or tools.

Another object of my invention is to provide an improved tool setting gauge having separate and independent means for determining first the rough setting of the cutting tool or tools in accordance with the size, shape, or thickness of the workpiece, and then for determining the finer or more accurate setting or adjustment of the cutting tool or tools.

A further object of my invention is to provide a gauge of the foregoing character in which the gauge is provided with releasable means for locking or maintaining the proper adjustment of the gauge for repeated use in gauging cutting tools wherein all of the tools require the same degree of adjustment or setting.

Another object of my invention is to provide an improved tool setting gauge wherein the independent means for determining the finer and accurate setting of the cutting tool or tools is bodily adjustable lengthwise with relation to a portion of the supporting body portion or frame of the gauge.

The foregoing and other objects and advantages of my invention will be apparent from the following description and appended claims when considered in connection with the accompanying drawing forming a part of this specification, wherein like reference characters designate corresponding parts in the several views.

In said drawing:

Figure 1 is a perspective view of an improved cutting tool gauge embodying my invention.

Figure 2 is a top plan view illustrating one application or use of the improved tool gauge of my invention.

Figure 3 is an enlarged detail sectional view taken substantially along the line 3—3 of Figure 2, looking in the direction of the arrows.

Figure 4 is a top plan view of the structure shown in Figure 3; and

Figure 5 is a top plan view of a fragment of one type of lathe or other machine having adjustable cutters or tools which may be gauged and set by the use of my improved tool gauge.

Before explaining in detail the present invention it is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation, and it is not intended to limit the invention herein claimed beyond the requirements of the prior art.

Referring particularly to Figures 1, 2, 3 and 4 of the drawing, there is shown in this figure one preferred form of tool gauge embodying my present invention. As shown, the gauge comprises a substantially L-shaped frame or body member having right angularly disposed portions 10 and 11. The inner edge of the portion 11 is provided with an adjustable bolt or gauge member shown as a whole at 12 which is threaded into a threaded opening extending transversely through the member 11 and which is provided with a lock nut or securing means 13 to maintain the member 12 in its desired position of adjustment. The gauge member 12 is adapted to be set in accordance with the rough thickness of the stock to be operated upon by the cutting tool or tools.

As seen in Figures 1 and 2, the rough adjustment gauge member 12 may have, if desired, a screw slot 12a formed in the head thereof to permit of its adjustment with relation to the supporting frame portion 11. Or, if desired, the shank thereof adjacent the head may be provided with a square or hexagonal cross section 12b to receive a wrench for adjustment purposes.

The frame portion 11 is provided on one of its broad faces or surfaces with a longitudinally adjustable plate or block member 14 having slots 15 formed therein with which adjustment screws or bolts 16 cooperate to permit the block to be moved longitudinally over the frame portion 11 and to be secured in any desired position with relation thereto. As shown, the block 14 is provided with an integral enlargement which forms a tool-engaging cutting depth gauge member, shown as a whole at 17. This member, as shown, is provided with a hollow body portion housing or casing 18 having an elongated longitudinally extending slot 19 formed therein and with a tool-engaging plunger or member 20 supported therein and urged into projected positon by means of a coil spring 21 which is located within the hollow body portion 18 and held in place by a removable cap or cover member 22. It will be noted that the forward end of the plunger 20 is provided with a notched out portion 20a to provide a flat face on which a centering line or mark 20b is located. This permits the notched end 20a of the plunger to be accurately aligned with the tip of the cutting tool whose adjustment is to be gauged. As seen in Figures 1, 2 and 4, the body portion 18 is provided with a graduated scale 23 located opposite the slot 19. The plunger 20 carries an indicating finger 24 which projects outwardly through the slot 19 and overlies the graduations of scale 23. It will be understood that as the plunger 20 is moved, the indicator 24 will likewise move and will register with one of the graduations of the groove 23 to indicate the position of the cutting tool with which the plunger is engaged and to permit the proper adjustment or setting of said tool.

If it is desired to maintain the plunger 20 in any one of its desired adjusted positions, it is merely necessary to rotate the set screw 25 carried by the body portion 18 until the end of the screw engages the plunger. Thus, the tool gauge may be used over and over again at a given adjustment and with a plurality of tools which are to be set to a minute adjustment to ensure the proper depth cut which is desired.

Referring particularly to Figure 5, there is shown one type of machine and cutting tool with which the gauge of my invention may be used. The machine is shown as a whole at 26 and is provided on its bed with a series of cutting tool supporting blocks 27 each of which is provided with a cutting tool 28. These tools are adapted to be moved into position to successively engage and cut the work piece 29 which is rotatably supported by the head stock and tail stock of the machine or lathe 26.

It will be understood that the combined plate or block member 14 and the gauge member 17 may be supported on either of the broad faces of the portion 11 of the support or body of the gauge. To permit this, the portion 11 of the frame is drilled through from one face to the other to receive the adjustment screws or bolts 16 so that this member may be applied to either face of the portion 11, thus producing either a left-hand tool gauge or a right-hand tool gauge, as desired.

In use, the adjustable rough gauge member 12 is first set in accordance with the rough thickness of the stock to be engaged by the cutting tool, the lock nut 13 adjusted to hold the member 12 in place, whereby the leg member or portion 10 of the gauge is placed flatwise against the edge A of a cutting tool supporting block 27 with the inner face of the member 12 in engagement with the face B of said block. The bolts 27a are now released to free the cutting tool 28 and to permit its tip to engage the notched end 20a of the fine adjustment gauge member in line with the mark 20b on said member. By moving the tool 28 and, because of its engagement with the plunger 20, likewise the plunger, until the indicating finger 24 registers with the proper graduation of the scale 23, the tool 28 may be set to its proper cutting position. When this adjustment has been achieved, the bolts 27a are tightened down and the tool 28 is in its proper position for operation upon the workpiece. The gauge is then removed from engagement with the tool block and cutting tool and the operation may be again repeated to adjust other tools for the same setting or for a wide variety of settings, if desired. Once the adjustment has been obtained, if other tools are to be likewise set, the setscrew 25 may be moved into engagement with the plunger 20 and the continued gauging of cutting tools carried out.

My device is of relatively simple construction, easy to use and handle and one which may be successfully used by unskilled workmen.

While I have shown the fine adjustment gauge member 17 as being of substantially square cross section, it will be understood that if desired this member may be tubular. Moreover, while I have shown a plunger 20 of round cross section, this member may be of any desired shape or cross section.

Having thus described my invention, what I claim is:

1. A gauge for setting cutting tools comprising a substantially L-shaped frame a portion of which is adapted to be engaged with an edge face of a cutting tool carrying block, adjustable means carried by another portion of said frame for engagement with another edge face of the block, and movable means comprising a housing portion carried by said last-named frame portion and a spring-projected plunger within said housing portion for engagement with the tip of a cutting tool carried by said block to indicate the correct setting of the tool with relation to work to be engaged and operated upon by it.

2. A gauge according to claim 1 wherein said housing portion and spring-projected plunger are adjustable lengthwise of said last-named frame portion.

3. A gauge for setting cutting tools comprising a substantially L-shaped frame a portion of which is adapted to be engaged with an edge face of a cutting tool carrying block, adjustable means carried by another portion of said frame for engagement with another edge face of the block, movable means comprising a hollow body portion carried by said last-named frame portion having a longitudinal slot in one wall thereof and a graduated scale adjacent said slot, a spring-projected plunger within the body portion for engagement with the tip of a cutting tool, and a pointer carried by the plunger projecting through said slot and cooperating with said graduations for indicating the setting of said cutting tool.

4. A gauge according to claim 1 wherein said adjustable means is provided for determining the rough adjustment of the cutting tool and wherein said movable means is provided for determining the fine and accurate adjustment of said cutting tool relative to a workpiece.

5. A gauge according to claim 1 wherein means is associated with said housing portion and said spring-projected plunger for releasably maintaining said plunger in any desired adjusted position.

6. A gauge for setting cutting tools according to claim 1 wherein said movable means may be mounted on either face of said last-named frame portion whereby to provide either a left hand or a right hand gauge.

7. A gauge according to claim 1 wherein said frame comprises a pair of right angularly disposed portions.

ALLEN T. HANES, Jr.